United States Patent
Imai et al.

Patent Number: 5,742,011
Date of Patent: Apr. 21, 1998

[54] LOAD CELL HAVING A NEUTRAL PLANE SPACED FROM A TOP SURFACE THEREOF BY A DISTANCE GREATER THAN FROM A BOTTOM SURFACE THEREOF

[75] Inventors: Kenji Imai; Yoshinobu Shimomae; Yoshiaki Shinada, all of Shiga, Japan

[73] Assignee: Ishida Co., Ltd., Kyoto, Japan

[21] Appl. No.: 548,477

[22] Filed: Oct. 26, 1995

[30] Foreign Application Priority Data

Oct. 28, 1994 [JP] Japan ............... 6-288900

[51] Int. Cl.$^6$ .............. G01G 3/14; G01G 3/08; G01L 1/04; G01L 1/22
[52] U.S. Cl. ............. 177/229; 73/862.634; 177/211
[58] Field of Search .................. 177/211, 229; 73/862.627, 862.629, 862.632, 862.633, 862.634

[56] References Cited

U.S. PATENT DOCUMENTS

| | | |
|---|---|---|
| 3,278,881 | 10/1966 | Anderson et al. ............... 177/211 |
| 4,128,001 | 12/1978 | Marks ............... 73/1 B |
| 4,212,197 | 7/1980 | Kawai et al. ............... 73/862.627 |

FOREIGN PATENT DOCUMENTS

| | | |
|---|---|---|
| 0 052 257 | 5/1982 | European Pat. Off. . |
| 2 247 698 | 5/1975 | France . |
| WO 83/00222 | 1/1983 | WIPO . |

OTHER PUBLICATIONS

Patent Abstracts of Japan, vol. 6, No. 46, p. 107, Japanese Appln. No. 56-162023, published Dec. 12, 1981.

*Primary Examiner*—Cassandra C. Spyrou
*Assistant Examiner*—Randy W. Gibson
*Attorney, Agent, or Firm*—Staas & Halsey

[57] ABSTRACT

Two thin walled strain generating areas are provided in each of upper and lower two beams provided between a fixed rigid body and a movable rigid body. The strain generating area of the upper beam is adapted to have a convex-shaped cross section such that the neutral plane which develops no strain in response to a bending moment acting on the strain generating area is spaced from the top surface by a distance unequal to that from the bottom surface. In addition, a strain detecting element is provided on the top surface which is more remote from the neutral plane than the bottom surface.

5 Claims, 8 Drawing Sheets

FIXED END SIDE

LOAD CELL HAVING A NEUTRAL PLANE SPACED FROM A TOP SURFACE THEREOF BY A DISTANCE GREATER THAN FROM A BOTTOM SURFACE THEREOF

BACKGROUND OF THE INVENTION

The present invention relates to a load cell for use in various weighing operations and, more particularly, to a load cell which detects electrically the load applied to a strain induced element of a specified geometry by measuring the change in an electrical characteristic of strain detecting elements such as strain gauges provided on the strain induced element.

Load cells of a two cantilevered beam type for use in electronic weighing instrument or the like generally use a strain induced element that has two parallel beams provided between a fixed rigid body at an end and a movable rigid body at the other end and that has two thin-walled strain generating areas provided in each of the beams by notching. A strain detecting element such as a strain gauge is provided on the surface of each strain generating area of the strain induced element and the tensile and compressive strains that develop in the strain generating areas in accordance with the load applied to the strain induced element are detected by the strain detecting elements so that the applied load is measured.

U.S. Pat. No. 4,423,640 discloses a load cell in which a cross section of a strain induced element is shaped to have a recessed portion, a strain detecting element is disposed in the recessed portion, and a foil covers the upper surface of the recessed portion.

In certain cases of the application of such load cells, speed is an important factor. To accomplish high-speed weighing, the natural frequency of the load cells must be increased and two techniques are conventionally known to be capable of meeting this need, one by increasing the cross-sectional area of each strain generating area and the other by reducing the notch pitch, or the distance between notches.

However, if the cross-sectional areas of the strain generating areas are increased to provide a higher natural frequency as in the first method, the stiffness of the strain generating areas increases to cause the disadvantage that the rated load of the load cell increases to reduce its sensitivity.

The second method which relies upon reducing the notch pitch also is not problem-free. As will be discussed below, the thickness of the notched portions (i.e., notch thickness) must be reduced in order not to lower sensitivity, so that there is a limit on the precision of machining that can be attained; in addition, an increased moment will act on the strain generating areas when the load is placed unevenly, so that there occurs an eccentric error in response to such uneven placement of the load.

These problems may be explained as follows. The natural frequency of the load cell f is expressed by:

$$f = 1/2\pi \cdot \sqrt{(k/m)} \tag{1}$$

where m is the mass of the load cell and k is the spring constant.

The equation (1) shows that in order to increase the natural frequency, the spring constant k may be increased if the mass m is constant.

If load F is applied to the load cell to cause a displacement x as shown in FIG. 14, the following equation holds:

$$F = k \cdot x \tag{2}$$

The equation (2) shows that in order to increase k, displacement x in response to a given load F may be reduced.

If the notch pitch of the load cell is written as L (see FIG. 14) and the angle of deflection that occurs in response to displacement x as θ, x can be approximated by the following equation:

$$x = L \cdot \sin\theta \tag{3}$$

It is therefore clear that in order to reduce the displacement x which occurs in the load cell, one may reduce either (1) the notch pitch L or (2) the angle of deflection θ.

The approach of reducing the notch pitch L is first reviewed. If a two-beam type load cell is regarded as the combination of two beams, the strain ε that develops in the strain generating area can be approximated by the following equation:

$$\epsilon = F \cdot L/4 \cdot Z \cdot E \tag{4}$$

where Z is the section modulus of the notched portion and E is the Young's modulus.

If a longitudinal section of the strain generating area, or the notch section is rectangular, the section modulus Z is expressed by $1/6(b \cdot t^2)$, so that eq. (4) can be reduced to:

$$\epsilon = 3 \cdot F \cdot L/2 \cdot b \cdot t^2 \cdot E \tag{5}$$

where t is the notch thickness and b is the notch width (cell width).

As eq. (5) also shows, the strain ε will decrease if the notch pitch L is reduced.

It should, however, be noted that even if the natural frequency of the load cell is high, a smaller amount of strain that is detected by the strain gauge will result in a smaller output signal, leading to reduction in the S/N ratio and, hence, to reduction in the output stability. Therefore, the strain ε in response to a given load F cannot be reduced.

Therefore, the notch pitch L must be reduced with the strain ε being kept constant. To meet this need, either the notch width b or the notch thickness t may be reduced as is clear from eq. (5). If the notch pitch b is reduced, the natural frequency increases in the vertical mode but decreases in the horizontal mode and the overall vibration characteristics of the load cell cannot be improved. On the other hand, the notch thickness t cannot be reduced without experiencing the aforementioned limit on the precision in machining.

If the notch pitch L is reduced too much, the capability of canceling the effect of uneven load placement by the Roverval mechanism decreases to cause the aforementioned problem of the occurrence of an increased eccentric error in response to such uneven load placement.

The approach of reducing the angle of deflection θ will now be reviewed. The surface which develops no strain when a bending moment acts on a strain generating area may be designated as the neutral plane, which is indicated by c in FIG. 15. If the distance from the neutral plane c to the top surface A is written as h and the distance from the neutral plane c to the bottom surface B as H, the strain ε developing on the top surface A is expressed by:

$$\epsilon = h \cdot \sin\theta \tag{6}$$

As eq. (6) shows, in order to reduce the angle of deflection θ without reducing the strain ε that develops in a load cell, the distance h from the neutral plane c to the top surface A must be increased.

If the strain generating areas of each beam in the load cell have a rectangular longitudinal section as in the prior art, H is nearly equal to h and t is nearly equal to 2h. Therefore, if the distance h is increased, the notch thickness t will also increase; as a result, the load required to develop a specified amount of strain ε increases to cause an unwanted reduction in sensitivity.

SUMMARY OF THE INVENTION

The present invention has been accomplished in order to deal with the aforementioned problems which have occurred to the attempt of enhancing the natural frequency of a load cell that uses a strain induced element in which upper and lower beams each having two thin-walled strain generating areas are provided between a fixed rigid body at an end and a movable rigid body at the other end, each of said strain generating areas having a strain detecting element provided on the surface. The principal object of the invention is to enhance the natural frequency of the load cell without causing a reduction in its sensitivity.

The present invention thus provided a load cell using a strain induced element in which upper and lower beams each having at least one thin-walled strain generating area are provided between a fixed rigid body at an end and a movable rigid body at the other end, each of said strain generating areas having a strain detecting element provided on the surface, characterized in that the strain generating area of each beam has a cross section of such a geometry that the neutral plane which develops no strain in response to a bending moment acting on the strain generating area is spaced from the top surface of the strain generating area by a distance unequal to that from the bottom surface of the strain generating area and further characterized in that the strain detecting element is provided on whichever of the top and bottom surfaces of the strain generating area that is more remote from the neutral plane.

Alternatively, the load cell is characterized in that the strain generating area of each of the upper and lower beams has a cross section of such a geometry that an upper cross section of the strain generating area is asymmetric with a lower cross section of the strain generating area with respect to a neutral plane which develops no strain in response to a bending moment acting on the strain generating area; and further the strain detecting element is provided on whichever of the top and bottom surfaces of the strain generating area that is more remote from the neutral plane.

Alternatively, the load cell is characterized in that the strain generating area of each of the upper and lower beams has a cross section of a convex shape such that a center of the strain generating area projects upward with respect to both lateral sides of the strain generating area; and further the strain detecting element is provided on a top surface of the projected center of the strain generating area.

Alternatatively, the load cell is characterized in that the strain generating area of each of said upper and lower beams has a cross section asymmetric in a vertical direction; and further the strain detecting element is provided on whichever of top and bottom surfaces of the strain generating area that is narrower in the width of the cross section.

According to the above described structure of the present invention, one surface of each strain generating area will experience a relatively greater strain than the other surface, whereby the required amount of distortion is insured even if the angle of deflection that occurs in response to a given load is small. As a result, the required sensitivity of the load cell is insured by providing strain detecting elements on that one surface of each strain generating area. Since the angle of deflection that occurs in response to a given load can be reduced while ensuring a specified amount of distortion, it is possible to reduce the displacement that occurs in response to a given load, whereby the spring constant of the strain induced element or the load cell is increased so as to enhance the natural frequency of the load cell taken as a whole.

DETAILED DESCRIPTION OF THE INVENTION

Preferred embodiments of the present invention will now be described in detail.

Figure 1:
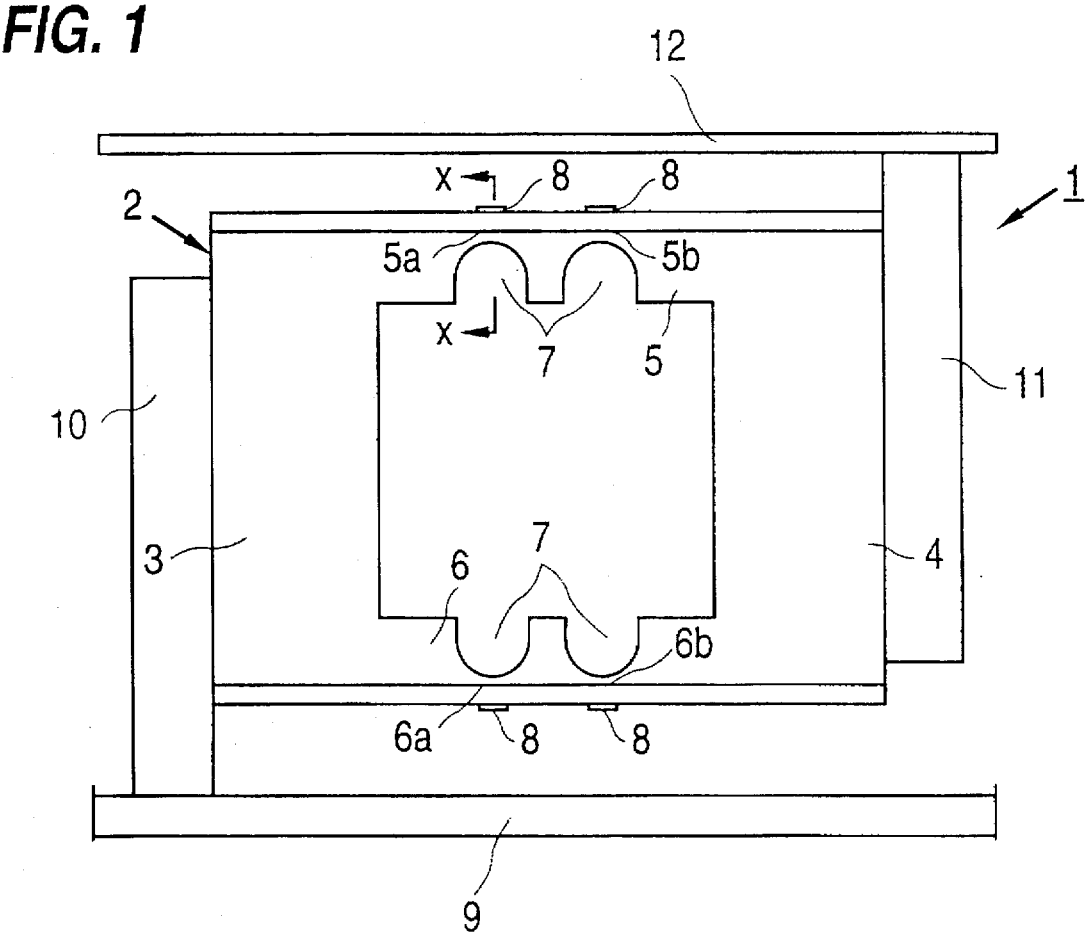
FIG. 1 is a front view of a load cell according to an example of the invention.

As shown in FIG. 1, load cell 1 comprises a strain induced element 2 in a hollow, generally rectangular prismatic form which consists of a fixed rigid body 3 at an end, a movable rigid body 4 at the other end, and a pair of beams 5 and 6 provided between the two rigid members 3 and 4 in the upper and lower positions, respectively. Each beam has substantially semicircular notches 7 provided in the inner surface of both sides so as to form thin-walled strain generating areas, which are indicated by 5a and 5b with respect to beam 5 and by 6a and 6b for beam 6. When a load is applied, the movable rigid body 4 is displaced downward relative to the fixed rigid body 3, thereby generating a tensile strain in the strain generating area 5a of the upper beam 5 which is located closer to the fixed rigid body 3 and in the strain generating area 6b of the lower beam 6 which is located closer to the movable rigid body 4, while generating a compressive strain in the strain generating area 5b of the upper beam 5 which is located closer to the movable rigid body 4 and in the strain generating area 6a of the lower beam 6 which is located closer to the fixed rigid body 3.

Figure 2:
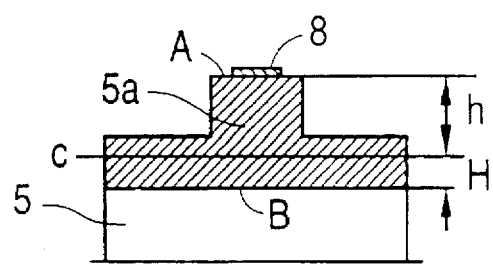
FIG. 2 is a cross section taken on line X—X of FIG. 1.

In this embodiment under consideration, the strain generating areas 5a and 5b of the upper beam 5 each have a cross section which, as shown enlarged in FIG. 2, has a convex shape the center of which projects upward with respect to both lateral sides, and a strain gauge 8 is provided on the top surface A of the central part of each strain generating area. Since the strain generating areas 5a and 5b have such a convex-shaped cross section, the neutral plane c which develops no strain in response to a bending moment acting in the vertical direction is shifted to a lower position than in the prior art where the strain generating areas have a rectangular cross section and, as a result, the distance h from the neutral plane c to the top surface A of each strain generating area becomes greater than the distance H from the neutral plane c to the bottom surface B of said strain generating area.

Figure 3:
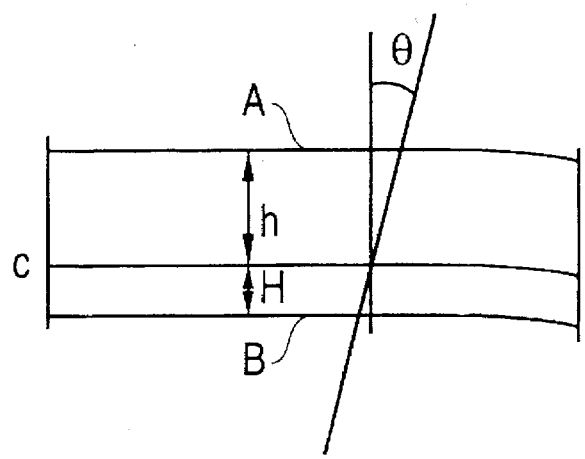
FIG. 3 shows schematically how a bending moment acts on a strain generating area.

This relationship (h>H) offers the advantage that even if the angle of deflection θ that occurs under a given load is small as shown in FIG. 3, the length of distance h insures a sufficient amount of strain to be detected with high sensitivity by means of strain gauges 8 provided on the top surface A.

The strain generating areas 6a and 6b of the lower beam 6 also have a convex-shaped cross section in which the center projects downward of the lateral sides and strain gauges 8 are provided on the bottom surface of the central part of each strain generating area.

The ratio of the distances h/H is preferably 1.05 or more in view of the effect of the invention.

One application of the load cell 1 is in an electronic weighing instrument. In a case like this, the fixed rigid body 3 which is one part of the strain induced element 2 is secured to a base 10 erected on a base 9 whereas the movable rigid body 4 is fitted with a weighing platform 12 via a bracket 11.

When an object to be weighed is placed on the weighing platform 12, its weight is transmitted through the bracket 11 and exerted on the movable rigid body 4 at an end of the strain induced element 2, whereupon the movable rigid body 4 is displaced downward with respect to the fixed rigid body 3 at the other end. As a result, a tensile strain develops in the top surface of the strain generating area 5a of the upper beam 5 which is located closer to the fixed rigid body 3 whereas a compressive strain develops in the top surface of the strain generating area 5b which is located closer to the movable rigid body 4; at the same time, a compressive stain develops in the bottom surface of the strain generating area 6a of the lower beam 6 which is located closer to the fixed rigid body 3 whereas a tensile strain develops in the bottom surface of the strain generating area 6b which is located closer to the movable rigid body 4. In response to these strains, the resistances of four strain gauges 8 will change. If those gauges are connected in the form of a Wheatsone bridge, a voltage corresponding to the applied load is produced as an output from the bridge circuit. By proper conversion, the weight of the object of interest can be determined from the output voltage.

In the present invention, the strain generating areas 5a/5b and 6a/6b of the upper and lower beams 5 and 6 which are components of the strain induced element 2 are designed to have a cross section that is convex-shaped such that the neutral plane c which develops no strain in response to a bending moment acting on the respective strain generating area is spaced from its top surface by a distance unequal to that from the bottom surface. According to the invention, strain gauges 8 are provided on whichever of the top and bottom surfaces of the strain generating areas 5a/5b and 6a/6b that is more remote from the neutral plane c. The two features described above of the invention combine to enable the production of load cell 1 which has an increased natural frequency without sacrificing the sensitivity of measurement.

The result of an experiment conducted to evaluate the performance of the embodiment under consideration is described below.

Figure 4:
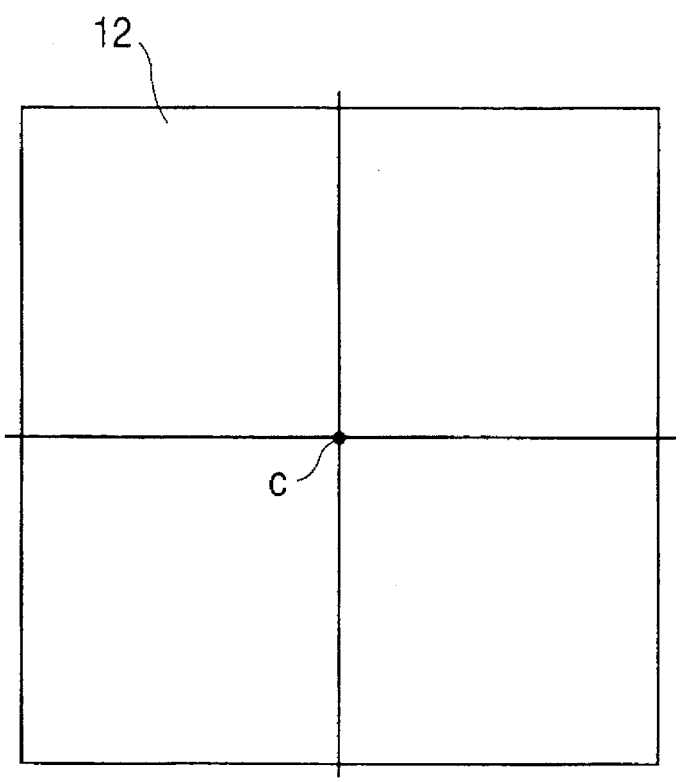
FIG. 4 is a plan view showing the point at which the applied load is working on a weighing platform.

A strain induced element in the form of a rectangular prism measuring 90 mm long, 60 mm high and 20 mm wide was notched by a pitch of 15 mm and a radius of 5 mm to form strain generating portions that were 0.75 mm high in the periphery, and 0.95 mm high and 6 mm wide in the central part. The thus constructed load cell was used as a test specimen, with its rated load being set at 9.0 kgf. After assembling this test specimen into an electronic weighing instrument as shown in FIG. 1, a load weighing 2.66 kgf was placed on weighing platform 12 such that it would act at its central point C as shown in FIG. 4, and the resulting natural frequency was measured.

A comparative specimen was fabricated from a strain induced element in the form of a hollow rectangular prism measuring 90 mm long, 60 mm high and 20 mm wide, which was notched by a pitch of 15 mm to form strain generating areas that had a rectangular cross section in a thickness of 1.09 mm. The thus constructed load cell was used as a test specimen, with its rated road being set at 9.0 kgf, and subjected to the same experiment as described above.

Figure 5:
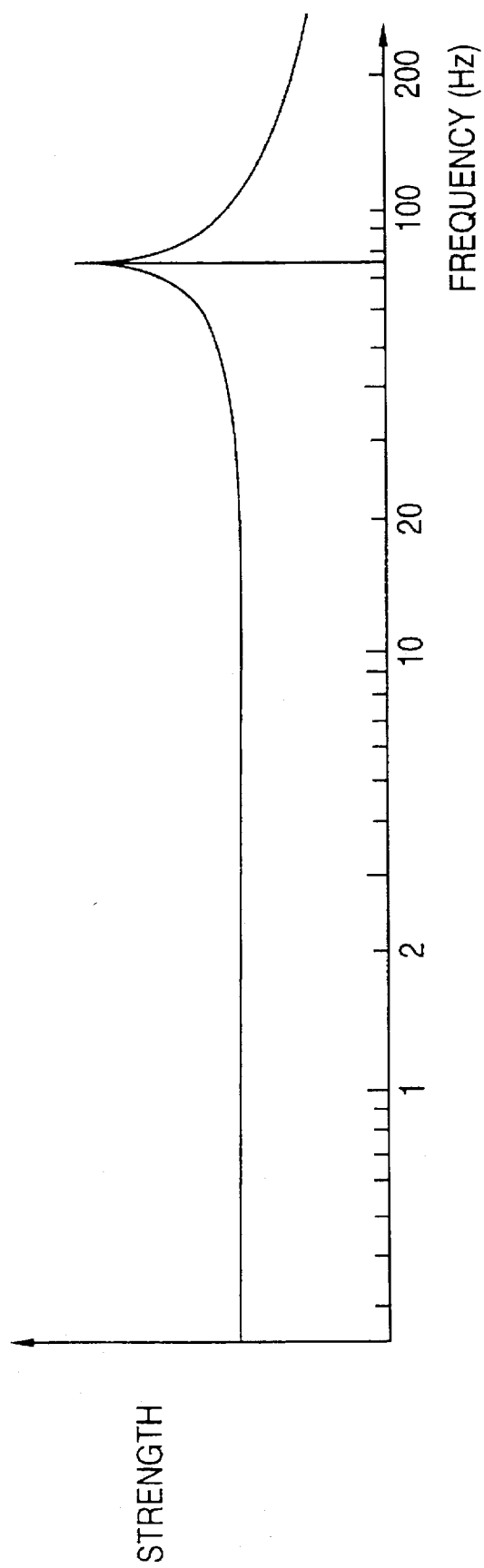
FIG. 5 is a graph showing the frequency characteristic of a load cell as a comparative specimen.
Figure 6:
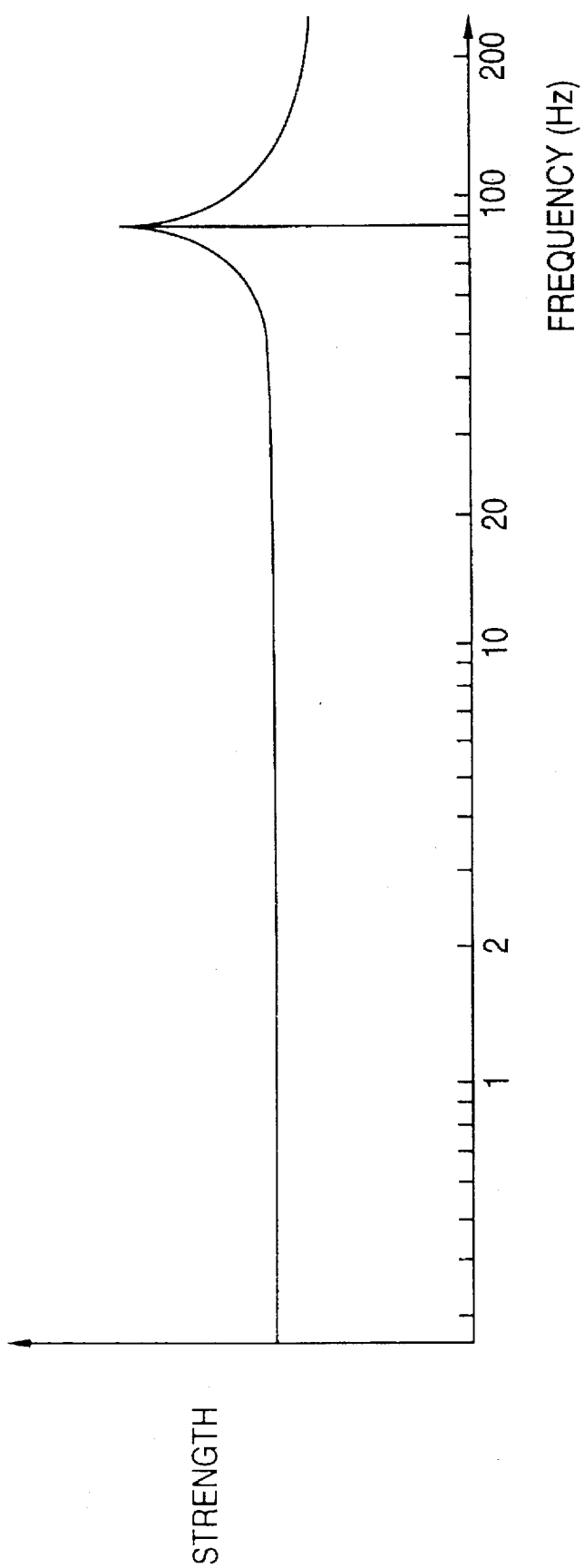
FIG. 6 is a graph showing the frequency characteristic of a load cell as a specimen of the invention.
Figure 7:
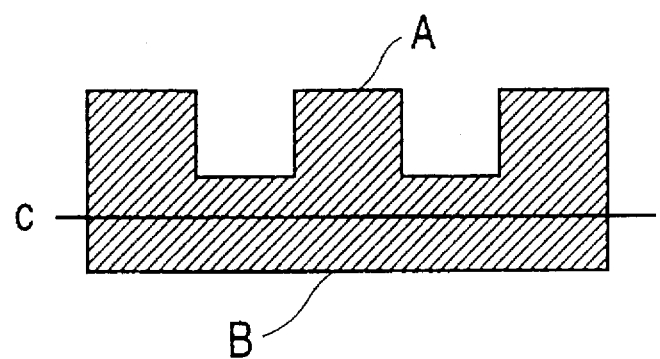
FIG. 7 is a cross section of a strain generating area of a beam in a load cell according to another example of the invention.
Figure 8:
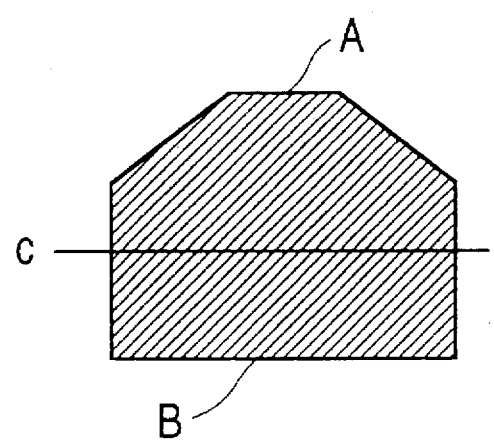
FIG. 8 is a cross section of a strain generating area of a beam in a load cell according to yet another example of the invention.
Figure 9:
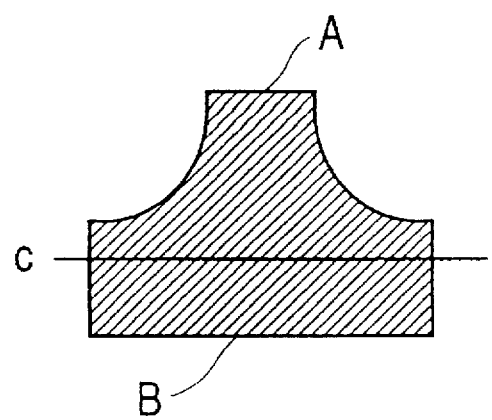
FIG. 9 is a cross section of a strain generating area of a beam in a load cell according to a further example of the invention.
Figure 10:
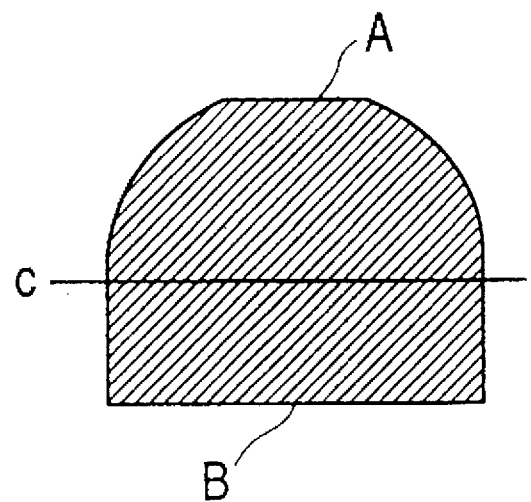
FIG. 10 is a cross section of a strain generating area of a beam in a load cell according to a still further example of the invention.
Figure 11:
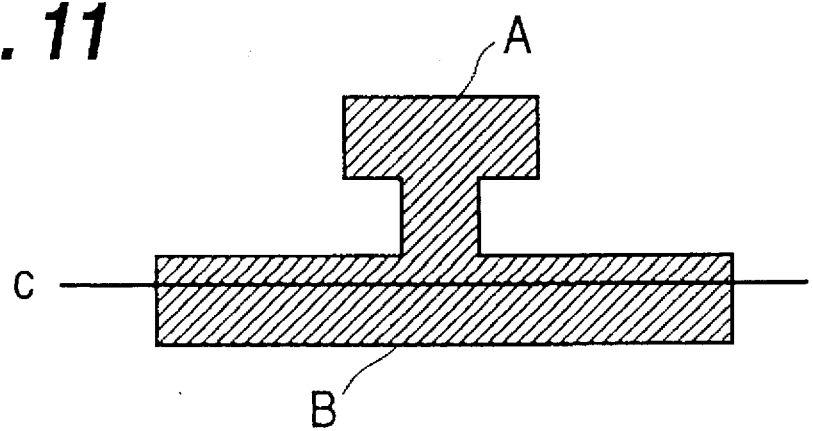
FIG. 11 is a cross section of a strain generating area of a beam in a load cell according to another example of the invention.

The change in the natural frequency of the comparative specimen is shown in FIG. 5 and the corresponding data for the specimen of the invention are shown in FIG. 6. The natural frequency of the comparative specimen peaked at around 77 Hz whereas that of the present example peaked at around 85 Hz, which was obviously higher than the peak for the comparative specimen.

The invention is by no means limited to the example described above and the strain generating areas of each beam may be adapted to have various other shapes of a cross section that are shown in FIGS. 7–11 and which share the common feature that the distance from the neutral plane c to the top surface A is greater than the distance from the neutral plane c to the bottom surface B. All that is needed is that the neutral plane which develops no strain in response to a bending moment acting on each strain generating area should be spaced from its top surface by a distance unequal to that from the bottom surface.

Figure 12:
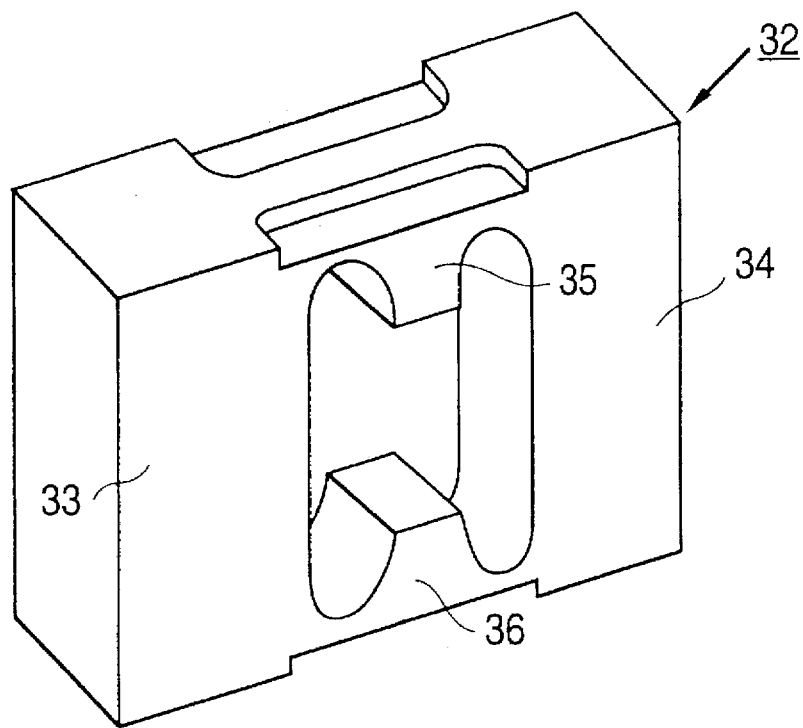
FIG. 12 is a perspective view showing another example of the strain induced element in the load cell of the invention.
Figure 13:
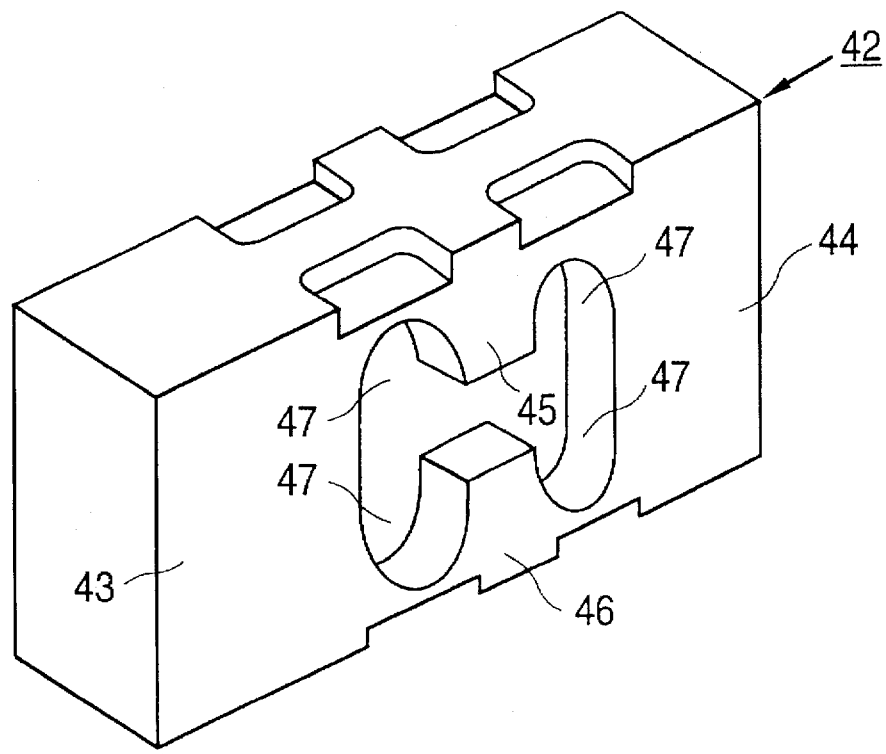
FIG. 13 is a perspective view showing yet another example of the strain induced element in the load cell of the invention.
Figure 14:
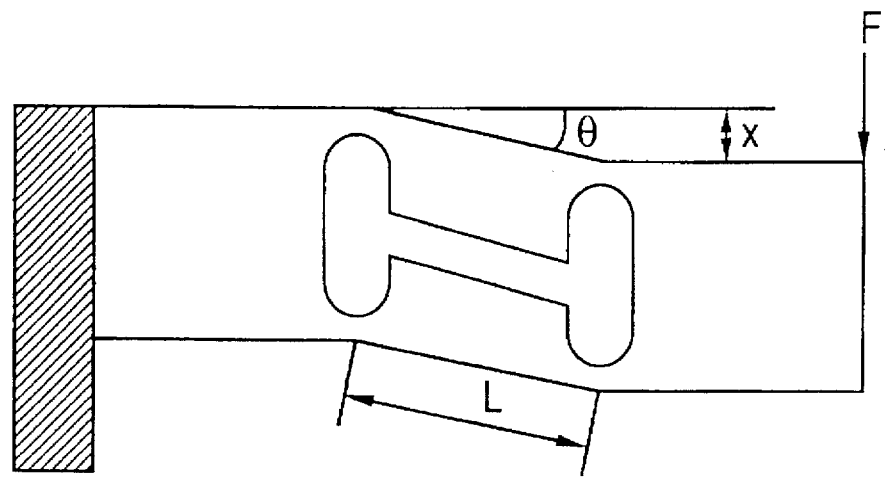
FIG. 14 is a diagram showing schematically how the applied load works on the strain induced element of a load cell.
Figure 15:
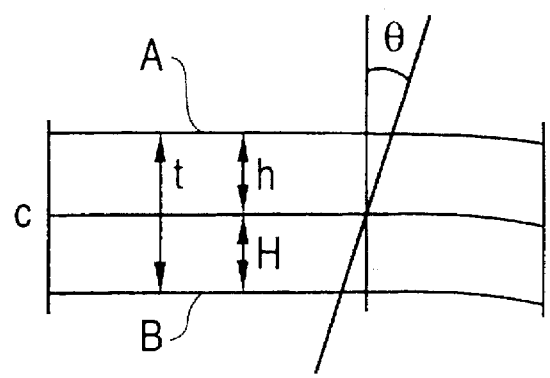
FIG. 15 is a diagram showing schematically how a bending moment acts on a strain generating area in a load cell.

In other words, each of the strain generating areas suffices to be asymmetric in the vertical direction and the strain induced element in a generally rectangular prism form may be adapted as shown in FIGS. 12 and 13. FIG. 12 shows a strain induced element 32 having an upper beam 35 and a lower beam 36 provided between a fixed rigid body 33 at an end and a movable rigid body 34 at the other end, in which the top surface of upper beam 35 is recessed on both lateral sides and the bottom surface of lower beam 36 is also recessed on both lateral sides. FIG. 13 shows a strain induced element 42 having an upper beam 45 and a lower beam 46 provided between a fixed rigid body 43 at an end and a movable rigid body 44 at the other end, in which the top surface of upper beam 45 is recessed on both lateral sides in positions that correspond to notches 47 which form strain generating areas and the bottom surface of lower beam 46 is also recessed on both lateral sides in positions that correspond to notches 47 which similarly form strain generating portions.

Figure 16:
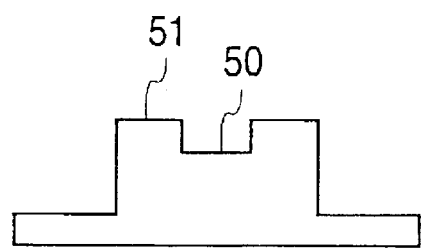
FIG. 16 is a cross section of a strain generating area of a beam in a load cell according to a modified example of the invention.

Further, as shown in FIG. 16, if the distance between the top surface and the neutral plane is sufficiently longer than the distance between the bottom surface and the neutral plane, a recessed portion 50 in which a strain detecting element is disposed may be formed in a protruded surface 51 of a protrusion of a strain generating area.

As described on the foregoing pages, the present invention is characterized in that the beams which are two components of a strain induced element are each adapted to have a cross section of such a geometry at the strain generating areas that the neutral plane which develops no strain in response to a bending moment acting on said strain generating areas is spaced from the top surface of said strain generating areas by a distance unequal to that from their bottom surface and, in addition, strain detecting elements are provided on whichever of the top and bottom surfaces of each strain generating area that is more remote from the neutral plane. These two features combine to enable the production of a load cell having an increased natural frequency without sacrificing its sensitivity.

What is claimed is:

1. A load cell, comprising:
   a strain induced element including:
      a fixed rigid body;
      a movable rigid body;
      an upper beam having at least one thin-walled strain generating area and provided between said fixed rigid body at an end and said movable rigid body at the other end;
      a lower beam having at least one thin-walled strain generating area and provided between said fixed rigid body at an end and said movable rigid body at the other end; and
      a strain detecting element provided on a surface of each of said strain generating areas;
   wherein said strain generating area of each of said upper and lower beams has a cross section of such a geometry that a neutral plane which develops no strain in response to a bending moment acting on said strain generating area is spaced from a top surface of said strain generating area by a distance unequal to that from a bottom surface of said strain generating area; and
   wherein said strain detecting element is provided on whichever of the top and bottom surfaces of said strain generating area that is more remote from said neutral plane.

2. A weighing apparatus comprising a load cell recited in claim 1.

3. A load cell, comprising:
   a strain induced element including:
      a fixed rigid body;
      a movable rigid body;
      an upper beam having at least one thin-walled strain generating area and provided between said fixed rigid body at an end and said movable rigid body at the other end;
      a lower beam having at least one thin-walled strain generating area and provided between said fixed rigid body at an end and said movable rigid body at the other end; and
      a strain detecting element provided on a surface of each of said strain generating areas;
   wherein said strain generating area of each of said upper and lower beams has a cross section of such a geometry that an upper cross section of said strain generating area is asymmetric with a lower cross section of said strain generating area with respect to a neutral plane which develops no strain in response to a bending moment acting on said strain generating area; and
   wherein said strain detecting element is provided on whichever of the top and bottom surfaces of said strain generating area that is more remote from said neutral plane.

4. A load cell, comprising:
   a strain induced element including:
      a fixed rigid body;
      a movable rigid body;
      an upper beam having at least one thin-walled strain generating area and provided between said fixed rigid body at an end and said movable rigid body at the other end;
      a lower beam having at least one thin-walled strain generating area and provided between said fixed rigid body at an end and said movable rigid body at the other end; and
      a strain detecting element provided on a surface of each of said strain generating areas;
   wherein said strain generating area of each of said upper and lower beams has a cross section of a convex shape such that a center of said strain generating area projects upward with respect to both lateral sides of said strain generating area;
      wherein said strain detecting element is provided on a top surface of said projected center of said strain generating area; and
      wherein a neutral plane in said strain generating area which develops no strain in response to a bending moment acting on each strain generating area is spaced a distance h from the top surface thereof greater than a distance H from a bottom surface thereof.

5. A load cell for high speed weighing, comprising:
   a strain induced element including:
      a fixed rigid body;
      a movable rigid body;
      an upper beam having at least one thin-walled strain generating area and provided between said fixed rigid body at an end and said movable rigid body at the other end;
      a lower beam having at least one thin-walled strain generating area and provided between said fixed rigid body at an end and said movable rigid body at the other end; and
      a strain detecting element provided on a surface of each of said strain generating areas;
   wherein said strain generating area of each of said upper and lower beams has a cross section asymmetric in a vertical direction; and
   wherein said strain detecting element is provided on whichever of top and bottom surfaces of said strain generating area that is narrower in width of said cross section.

* * * * *

UNITED STATES PATENT AND TRADEMARK OFFICE
CERTIFICATE OF CORRECTION

PATENT NO. : 5,742,011
DATED : April 21, 1998
INVENTOR(S) : Imai et al.

It is certified that error appears in the above-identified patent and that said Letters Patent is hereby corrected as shown below:

Col. 2, line 26, "he" should be --be--;
Col. 2, equation 6 should be --$\varepsilon \propto h \cdot \sin\theta$ Signed and Sealed this Third Day of November, 1998

Attest:

BRUCE LEHMAN

Attesting Officer

Commissioner of Patents and Trademarks